J. A. AXELSSON.
CHUCK.
APPLICATION FILED JAN. 8, 1921.

1,426,704.

Patented Aug. 22, 1922.

Inventor.
Johan Arvid Axelsson
By Lawrence Langner
Attorney

UNITED STATES PATENT OFFICE.

JOHAN ARVID AXELSSON, OF ESKILSTUNA, SWEDEN.

CHUCK.

1,426,704.  Specification of Letters Patent.  Patented Aug. 22, 1922.

Application filed January 8, 1921. Serial No. 435,858.

*To all whom it may concern:*

Be it known that I, JOHAN ARVID AXELSSON, foreman, a subject of the King of Sweden, and resident of Eskilstuna, in the county of Sodermanland and State of Sweden, have invented certain new and useful Improvements in Chucks (for which I have filed applications in Sweden May 21, 1919, No. 2,341, and Sept. 16, 1920, No. 4,655), of which the following is a specification.

The present invention relates to a chuck in which the thrust or axial pressure as well as the tangential one or both arising during the work is utilized to clamp the jaws round the blank to be worked or the tool respectively.

This is arrived at by the fact that the top ends of the jaws, which tops are preferably sloping towards the center cooperate with oblique faces on a sleeve sliding longitudinally in a central boring of a second sleeve fixed to the boring spindle the first mentioned sleeve being in turn acted upon by a member sliding axially in this sleeve. Said member is at its top provided with oblique faces, which, by means of balls or the like arranged in the bottom of the cylindrical boring cooperate with oblique faces arranged at the top end of the sleeve in such a manner that the slidable member is pushed upward when the drill is pushed upward in the drill socket, said member, by means of the balls and the oblique faces pressing the sleeve downward so that said sleeve will bring the jaws together.

Utilizing the tangential pressure of the drill is established by the fact that there is at the bottom end of the first mentioned sleeve a flange provided with an oblique face, as shown in Fig. 5, cooperating with balls or the like arranged in recesses of the sleeve fixed to the boring spindle and as a result the first mentioned sleeve will be pushed downward and will also act upon the jaws at tangential pressure.

The invention is illustrated in the accompanying drawings, in which—

Figure 1:
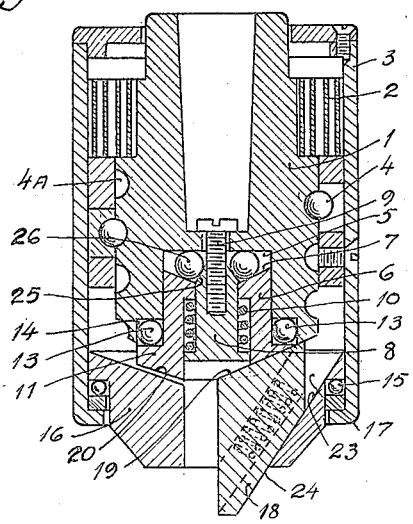
Figure 1 is a vertical sectional view of one form of chuck constructed according to the present invention.

The chuck consists of a sleeve 1 fixed to the boring spindle, said sleeve 1 being by means of a spring 2 connected with an exterior sleeve 3. At the interior side of the sleeve 3 there are balls 4, arranged in spherical recesses, said balls cooperating with a spiral groove $4^a$ in the sleeve 1, by means of which groove the sleeve 3 is lowered when being stopped during the rotation. The sleeve 1 is further provided with a cylindrical boring 5 in which there is arranged a longitudinally sliding sleeve 6 the top face 7 of which is sloping towards the center. The sleeve 6 has arranged within it a member 8 sliding axially in said sleeve. This member 8 is carried by a screw 9 passing through the bottom of the cylindrical boring 5. Between the sleeve 6 and the member 8 is arranged a spiral spring 10 normally pressing the sleeve 6 upwards. The sleeve 6 is further provided with a flange 11 having oblique faces 12 against which are resting balls 13 arranged in a recess 14 in the sleeve 1 fixed to the boring spindle. Resting on balls 15 in the bottom end of the sleeve 3 is a member 16 in which there are arranged, in notches 17, radially slidable jaws 18 the top faces of which are provided with oblique faces 19 cooperating with oblique faces 20 on the sleeve 6. In the member 16 are further arranged spiral springs 21 opening the jaws when they are not acted upon by the described clamping arrangements. In the bottom part of the sleeve 6 there are arranged notches 22 guiding the jaws 18 in this sleeve.

When a drill is to be inserted during the rotation of the chuck the operator catches the sleeve 3. The sleeve being held against rotation will, as a result, be lowered on account of the cooperation of the spiral groove 4ª with the balls 4, the jaws acted upon by the springs 21 being, as a result, departed from the center and the chuck opened so as to allow the drill to be inserted into the same. When the sleeve 3 is hereafter, released, the sleeve will again rise. As a result the jaws are rigidly clamped round the drill on account of oblique notches 23 arranged in the member 16, said notches cooperating with the bottom oblique faces 24 of the jaws.

When the drill is after this exposed during the work to axial and tangential pressure the member 8 is acted upon and pushed upward and acts by means of the oblique faces 25 upon the balls 26 which are in consequence moved laterally and act upon the oblique faces 7 on the sleeve 6 so that this sleeve is pushed downward and acts upon the jaws 18. As a result said jaws will further be clamped round the drill. The tangential pressure acting upon the jaws tends to turn the sleeve 6 relative to the sleeve 1. By this fact said sleeve 6 will on account of the oblique faces 12 and the balls 13 be pushed downward and will press the jaws further together.

Figure 2:
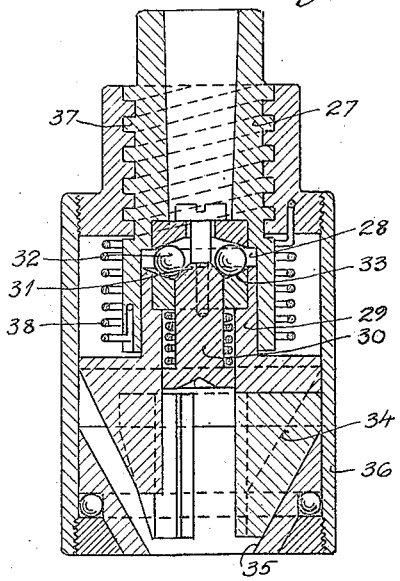
Figure 2 is a vertical sectional view of a modified form of chuck.
Figure 3:
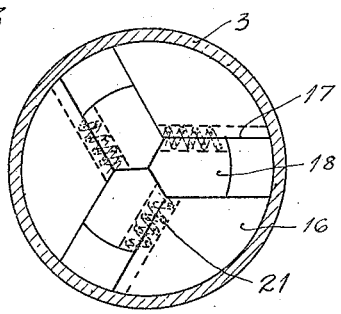
Figure 3 is a horizontal sectional view of the chuck illustrated in Figure 1.
Figure 4:
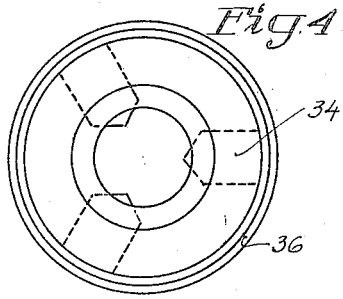
Figure 4 is a view corresponding to Figure 3 of the chuck illustrated in Figure 2.
Figure 5:
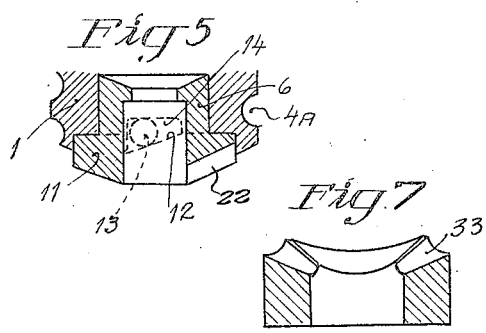
Figure 5 is a fragmentary vertical sectional view of the structure illustrated in Figure 1.
Figure 6:
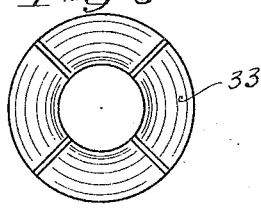
Figure 6 is a top plan view illustrating a detail of the construction shown in Figure 2.
Figure 7:
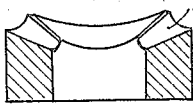
Figure 7 is a vertical sectional view of the part shown in Figure 6.

The embodiment of the invention illustrated in Figure 2 is a much simpler construction than that illustrated in Figure 1, there being used only one row of balls to receive the axial or tangential pressure or both. The balls are resting on steplike planes sloping radially or peripherically or in both directions as clearly set forth by Figs. 6 and 7.

27 is a sleeve fixed to the boring-spindle. This sleeve has a central boring 28 in which is arranged to slide axially a sleeve 29. In this sleeve is a body 30 sliding axially, said body being at its top provided with oblique faces 31, which by means of balls 32 arranged above the top end of the sleeve 29 cooperate with faces 33 sloping radially and peripherically and arranged on the top end of the sleeve 29 and in the bottom of the central boring. The jaws 34 are mounted in radial grooves arranged in the bottom end of the sleeve 29 and are pressed by means of oblique faces 35 arranged in an exterior sleeve 36, said oblique faces cooperating with the oblique bottom ends of the jaws 34, the sleeve 36 being connected with the interior sleeve 27 in a known manner by means of threads 37 and a spiral spring 38.

For persons skilled in the art the manner of working is obvious and needs no further explanation, axial or tangential pressure of both exerted upon the drill causing the several parts of the drill socket to perform the same work as described with respect to the first embodiment.

It will be seen that the invention may be varied in many respects without departing from the idea upon which it is based, namely procuring a drill socket for all purposes in which the axial pressure as well as the tangential one or both acting upon the drill will be utilized to clamp the jaws rigidly round the drill or the like.

Claims:

1. A chuck constructed to utilize the axial and tangential pressure on the tool during working for clamping the jaws around the tool, comprising a jaw supporting member having inclined guideways, jaws slidably mounted in said guideways, anti-friction members, and means having oblique faces cooperating with said anti-friction members for causing a pressing down of said jaws in said inclined guideways to thereby firmly clamp the tool when the latter is subjected to either axial or tangential pressure.

2. A chuck as set forth in claim 1, comprising a sleeve in which the jaw-supporting member is rotatably supported, a member journalled in said sleeve and adapted to be rigidly connected with the chuck spindle, and means interconnecting said sleeve and member for causing a frictional resistance to relative rotation between said parts.

3. A chuck as set forth in claim 2, in which the means for causing a pressing down of the jaws comprises a clamping member contained in the member which is adapted to be rigidly connected to the chuck spindle, said clamping member being movable axially and tangentially by the cooperating oblique faces and anti-friction members, and anti-friction members interposed between the sleeve and jaw-supporting member whereby the torsion effected by the tool causes a rotation of the clamping member or the jaw-supporting member in order to cause the jaws to automatically clamp the tool without rotating the sleeve.

4. A chuck as set forth in claim 2 in which the member adapted to be rigidly connected to the chuck spindle and the means for pressing down the jaws are provided with faces sloping in tangential, right as well as left, direction in order to effect the clamping of the jaws around the tool automatically when the tool rotates in either direction.

5. A chuck as set forth in claim 1 in which the means interconnecting said sleeve and member adapted to be rigidly connected to the chuck spindle comprises a spiral groove in one of said parts and a member carried by the other of said parts and engaging in said groove, whereby rotation of said sleeve relative to said member causes the sleeve to be lowered to permit the tool to be taken out.

6. A chuck as set forth in claim 5 including means for returning to initial position the means for pressing down the jaws when the tool ceases to rotate, whereby friction between the sleeve and the member adapted to be rigidly attached to the chuck spindle is relieved so that the tool can be taken out without applying a great rotating force to the sleeve.

7. A chuck comprising a sleeve adapted to be fixed to a boring spindle and having a central bore in its lower end, a sleeve slidable longitudinally in said bore and itself having a central bore, a member slidable in the bore of the second-mentioned sleeve, the top ends of the second-mentioned sleeve and the member having oppositely inclined oblique faces, anti-friction members arranged between the top wall of the central bore of said first-mentioned sleeve and said oblique faces, a jaw-supporting member having inclined guideways therein and jaws slidable in said guideways, the upper ends of said jaws engaging the lower end of said second-mentioned sleeve, whereby the upward axial pressure exerted by the drill upon the member within the bore of the second-mentioned sleeve pushes the latter downwardly whereby the jaws surrounding the drill are moved into firm clamping engagement with the latter.

In testimony whereof I have hereunto set my name in the presence of two subscribing witnesses.

JOHAN ARVID AXELSSON.

Witnesses:
 ERICH WISTRAW,
 A. CARLSSON.